April 10, 1962    G. D. BAKEHOUSE    3,028,678
INDICATOR GUIDE FOR TRACTOR DRAWN IMPLEMENTS
Filed June 22, 1959

Witness
Edw. P. Seeley

Inventor:- Glen D. Bakehouse
by M. Talbert Dick
Attorney

United States Patent Office 3,028,678
Patented Apr. 10, 1962

3,028,678
INDICATOR GUIDE FOR TRACTOR DRAWN IMPLEMENTS
Glen D. Bakehouse, R.R. 3, Hedrick, Iowa
Filed June 22, 1959, Ser. No. 821,932
3 Claims. (Cl. 33—185)

This invention relates to farm equipment and more particularly to a device attachable to a tractor for indicating to the operator of the tractor the proper lateral position of the tractor relative to the previous round so that the implement being pulled will cover a swath that does not overlap or deviate from the swath made by the implement in the previous round.

One of the most difficult tasks in farming is the proper guiding of the tractor so that the pulled implement such as a disk, harrow, cultivator or like, will process a swath that is accurately adjacent the previous swath made by the implement. There are two main reasons for this, i.e., the implement cuts a swath of a width much greater than that of the tractor and therefore the tractor path must be a considerable distance from the edge of the previously processed swath, and secondly, the driver of the tractor is forward of the implement being drawn and to determine the position of the swath presently being processed, it is necessary for him to turn around on the tractor and look rearwardly which obviously is highly objectionable. These problems are especially emphasized if the ground surface is not level or when contour farming is being practiced. Some attempt has been made to reduce the difficulties by markings. The marking of the ground by any means, however, is not efficient and many times the terrain is so rough or covered with vegetation that the marks will not be observable.

Therefore, one of the principal objects of my invention is to provide a guide indicator for installation on the front end of a tractor whereby the operator of the tractor never has to look to the rear during the forward movement of his tractor across the field.

A further object of this invention is to provide a guide indicator for tractors that may be easily and quickly adjusted to conform to the various widths of implements to be drawn by the tractor.

A still further object of this invention is to provide a guide indicator for tractors that may be easily and quickly removed from or placed on a tractor.

A still further object of this invention is to provide a guide indicator for tractors that is not damaged by coming into contact with obstructions such as rocks, tree stumps, vegetation or like.

Still further objects of my invention are to provide a guide indicator for tractors that is economical of manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
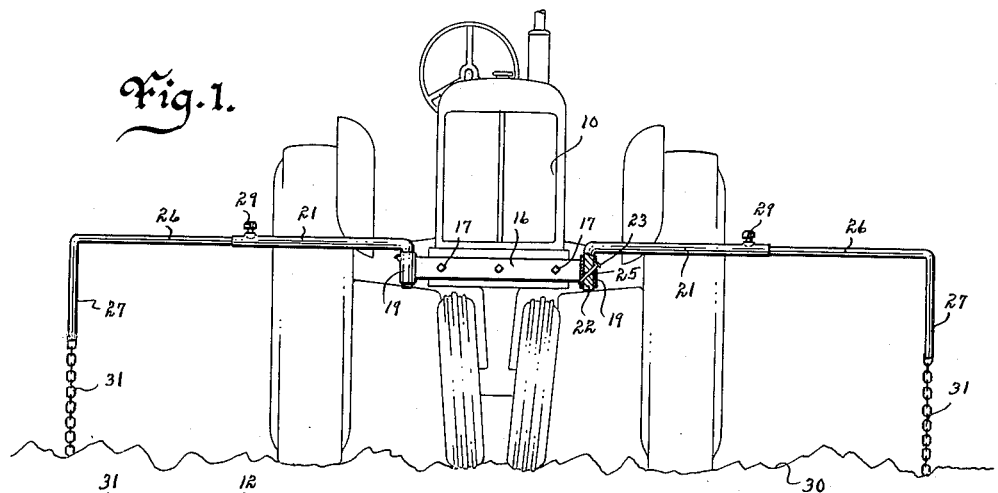
FIG. 1 is a front view of my device installed and in use.

Referring to the drawings, I have used the numeral 10 to designate an ordinary tractor pulling a farm implement 11 such as a disk. The numeral 12 designates a swath processed by the implement in the previous round. The numeral 13 designates the swath presently being processed by the implement. The numeral 15 designates the swath that will be processed by the implement during its present travel across the field. It is to such equipment that I secure my device and which I will now describe in detail.

Figure 2:
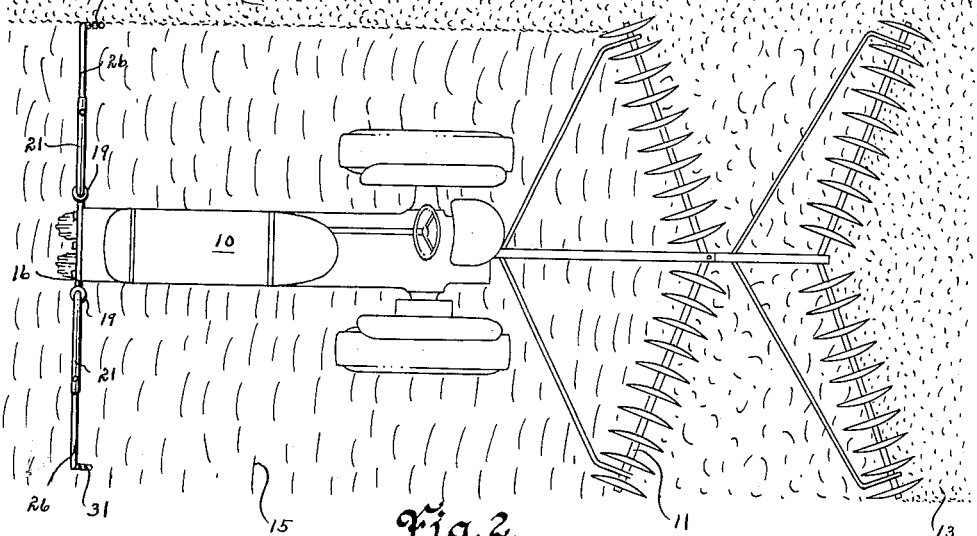
FIG. 2 is a reduced top plan view of my indicator guide secured to a tractor which is pulling an implement.
Figure 3:
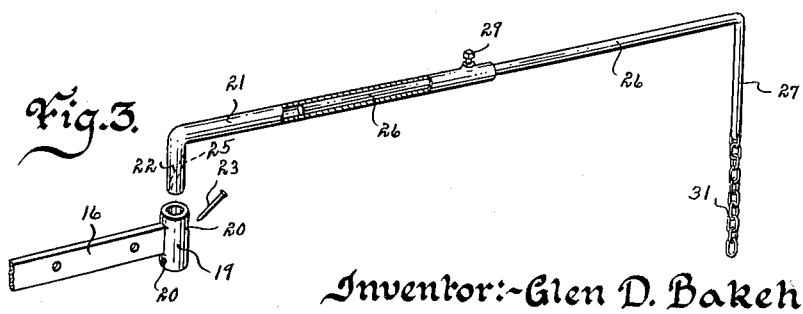
FIG. 3 is an enlarged perspective exploded view of one of my units and more fully illustrates its construction.

The numeral 16 designates a bar which more or less is secured permanently to the front end of the frame of the tractor by bolts or like 17 as shown in FIG. 1. At each end of the bar 16 is a vertical bearing member 19 having a downwardly and inwardly extending hole 20 through the outer and inner wall portions as shown in FIG. 3. The distance between the two bearings 19 is substantially less than the width of the tractor. The numeral 21 designates a horizontal pipe member having its inner end portion 22 bent vertically downwardly. Two of these pipe members 21 may be used inasmuch as a guide indicator may be desirable for each forward side of the tractor. This is especially true under certain conditions and also during the turning of the tractor in the finishing up of a small area of the field. Therefore with two of these members 21 in use, their ends 22 are rotatably placed downwardly in the two bearing members 19, respectively, as shown in FIG. 1. Obviously, when in use these two members 21 must extend laterally of the tractor and away from each other as shown in FIG. 2. To hold these tubular members 21 laterally of the tractor, I place a nail or shear pin 23 through each of the bearings 19 and through a hole 25 in the adjacent end portion 22 as shown in FIG. 1. These nails or like pins 23 detachably secure the members 21 but also in case the unit struck an unexpected object the pin 23 would shear and thereby prevent damage to the unit. To remove the device from the tractor it is merely necessary to withdraw the pins 23 from the bearings 19 and lift the members 21 from the bearings. Slidably mounted in the outer end portion of each of the members 21 is a rod 26 having its outer end portion 27 bent vertically downwardly as shown in FIG. 3. The numeral 29 designates a setscrew threaded through the wall of each of the pipe members 21 capable of engaging the rod 26 therein and holding the same against sliding movement. The ends 27 of these rods 26 terminate a substantial distance above the ground surface as shown in FIG. 1. This ground surface is designated by the numeral 30. The numeral 31 designates an elongated flexible member such as a chain or cable having its upper end secured to the lower end of each of the portions 27. These flexible members 31 extend downwardly and have their lower end portions engaging and dragging on the ground surface as shown in FIG. 2. This dragging of the free ends of the members 31 is not for the purpose of making a ground mark but to prevent them from laterally swaying to and fro during the movement of the tractor over the ground surface.

To use my device the set screws 29 are loosened and the rod members 26 adjustably slidably extended until their outer ends have a distance between them substantially that of the implement being drawn as shown in FIG. 2. This means that the inner most chain or like 31 will engage the ground surface at the inner edge of the previously processed swath 12. The set screws 29 are tightened to hold the rods 26 against undesirable sliding movement after they have once been properly adjusted. In using the device the tractor operator need only guide the tractor so that the innermost flexible member 31 engages the inner edge of the previous swath. To do this he has to only look forwardly of his position on the tractor and if he so guides the tractor as to hold the chain or like 31 in such a position, he may be assured that the present swath being processed by the implement is accurately adjacent the previously processed swath. If it is desired to drive the tractor through a relatively narrow entrance way, the pins 23 may be pulled, thus permitting the members 21 and 26 to fold rearwardly and inwardly toward the tractor. After the narrow passageway has been passed, the pipe members 21 may be swung forwardly to extend away from each other and the pins 23 replaced.

Some changes may be made in the construction and arrangements of my indicator guide for tractor drawn implements without departing from the real spirit and purpose of my invention, and it is my intention to cover by my claims, any modified forms of structure or use of mechanical equivalents which may be reasonably included within their scope.

I claim:

1. In a ground indicator guide adapted to be secured to a vehicle, a horizontal pipe member adapted to have one end secured to a vehicle and to extend transversely of the longitudinal axis of such vehicle, a rod slidably adjustably extending into said pipe member, and a flexible member operatively secured at one end to the outer free end of said rod and having a length sufficient to extend between the said rod and ground and in addition thereto a length sufficient to provide a substantial horizontal ground engaging trailing end portion whereby objectionable lateral swaying of the flexible member is eliminated.

2. In a ground indicator guide adapted to be secured to a vehicle, a horizontal pipe member adapted to have one end secured to a vehicle and to extend transversely of the longitudinal axis of such vehicle, a rod slidably adjustably extending into said pipe member, and a flexible link chain member operatively secured at one end to the outer free end of said rod and having a length sufficient to extend between the said rod and ground and in addition thereto a length sufficient to provide a substantial horizontal ground engaging trailing end portion whereby objectionable lateral swaying of the flexible member is eliminated.

3. In a ground indicator guide adapted to be secured to a vehicle, a horizontal pipe member adapted to have one end secured to a vehicle and to extend transversely of the longitudinal axis of such vehicle, a rod slidably adjustably extending into said pipe member having its outer end portion bent vertically downward, and a flexible member operatively secured at one end to the outer free end of said rod and having a length sufficient to extend between the said rod and ground and in addition thereto a length sufficient to provide a substantial horizontal ground engaging trailing end portion whereby objectionable lateral swaying of the flexible member is eliminated.

References Cited in the file of this patent

UNITED STATES PATENTS

| | | |
|---|---|---|
| 637,939 | Murray | Nov. 28, 1899 |
| 1,279,031 | Sprott | Sept. 17, 1918 |
| 2,396,467 | Keasler | Mar. 12, 1946 |
| 2,483,011 | Hudson | Sept. 27, 1949 |